United States Patent

Gouba

[11] 3,808,636
[45] May 7, 1974

[54] LINK CUTTING MACHINE
[76] Inventor: Alfred J. Gouba, 339 Atlantic Ave., Sloan, N.Y.
[22] Filed: May 25, 1972
[21] Appl. No.: 256,960

[52] U.S. Cl. ............................ 17/1 F, 17/33, 17/34
[51] Int. Cl. .......................................... A22c 11/00
[58] Field of Search ..................................... 17/1 F

[56] References Cited
UNITED STATES PATENTS
3,545,035  12/1970  Piereder ............................. 17/1 F
3,646,637  3/1972   Brendt ................................ 17/1 F
3,156,006  11/1964  Gouba ................................ 17/1 F Primary Examiner—Robert Peshock
Assistant Examiner—D. L. Weinhold
Attorney, Agent, or Firm—Bean & Bean

[57] ABSTRACT

A machine for severing joining areas of a chain of articles, such as sausages or weiners, as the chain is fed by a conveyor along a given course. A sensing device is provided for the purpose of sensing the presence of a joining area and releasing a follower finger for movement into engagement with the chain in the area of the sensed joining area. The engaged follower finger, which is forced to travel at a speed determined by that of the sensed joining area, serves to operate a joining area severing device, as a sensed joining area is presented thereto.

7 Claims, 6 Drawing Figures

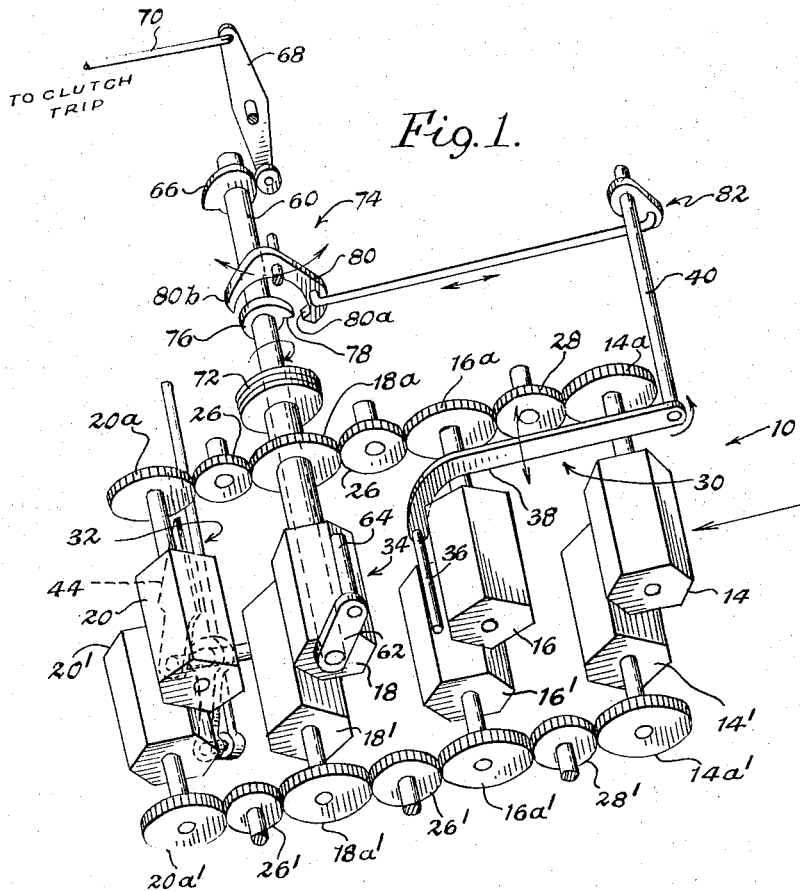
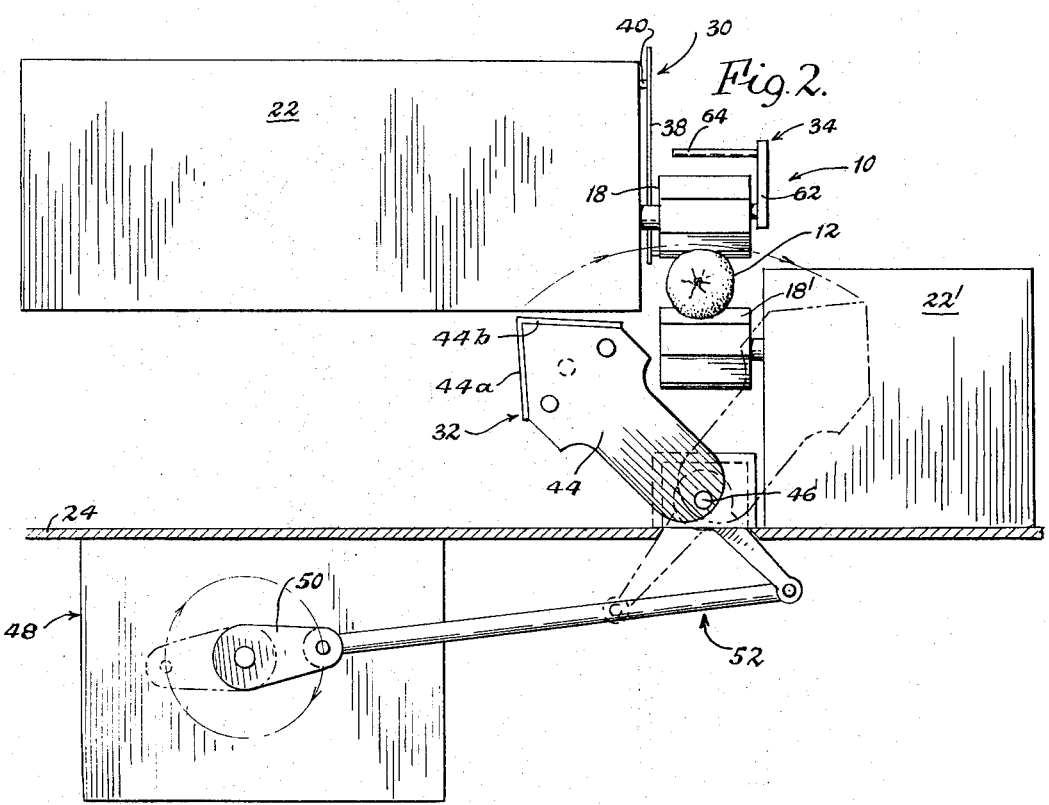

3,808,636

LINK CUTTING MACHINE

SUMMARY OF THE INVENTION

The present invention is directed to an improved machine adapted for use in automatically severing a chain of articles, such as sausages or weiners, into individual links.

More particularly, the present machine incorporates a conveyor for transporting the chain of articles and a sensing device for sensing the presence of a link joining area as the chain is forwarded by the conveyor and for controlling release of a follower finger for movement into engagement with the chain adjacent the sensed joining area. The engaged follower finger, which is forced to travel at a speed determined by that of the sensed joining area, serves to operate a joining area severing device, as a sensed joining area is presented thereto.

By coupling the severing device to the follower finger, articles of varying lengths may be accurately cut from the chain, even though the sensing and severing devices are disposed at fixed points spaced apart along the course of chain movement.

The present invention also features a unique conveyor construction, which features pairs of upper and lower drive rolls of octagonal configuration; the rolls of each pair and like rollers of adjacent pairs being preferably driven in an out of phase relationship of about 22.5°.

DRAWINGS

The nature and mode of operation of the present invention will now be more fully described in the following detailed description taken with the accompanying drawings wherein:

FIG. 1 is a perspective view of a machine embodying the present invention with parts removed for purposes of clarity;

FIG. 2 is an outlet end view of the machine illustrating the mode of operation of the link severing device;

DETAILED DESCRIPTION

Figure 3:
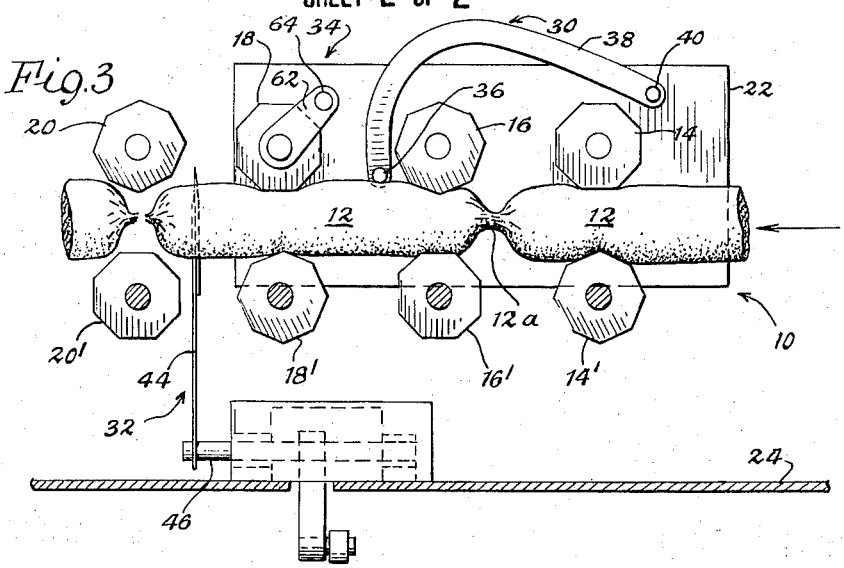
FIG. 3 is a front elevational view of the machine with parts removed for the purpose of clarity.

Reference is now made more particularly to FIGS. 1–3, wherein 10 generally designated a conveyor mechanism or advancing means for conveying a chain of articles or links 12, such as sausages or weiners joined in areas designated as 12a, in an endwise relationship through the machine along a given course. Conveyor mechanism 10 may be of any desired construction, but is shown for purposes of illustration as included pairs of upper and lower rolls 14, 14'; 16, 16'; 18, 18' and 20, 20', respectively, whose axes extend transversely of the given course.

Upper and lower rolls may be suitably mounted to extend from spaced machine framework housings 22 and 22', respectively, which are in turn suitably fixed to a mounting plate 24. In the preferred form of the present construction, all of the rolls are positively driven, as by a drive arrangement including roll affixed gears 14a, 14a'; 16a, 16a'; and 18a, 18a'; idler connecting gears 26, 26' and drive connecting gears 28, 28', which are suitably coupled to a conveyor drive, such as an electric motor, not shown. Suitable means, not shown, may be provided to vary the distance between the upper and lower rolls, as required to accommodate for various thicknesses of articles being conveyed. In this connection, it will be appreciated that the normal spacing between the upper and lower rolls is required to be less than the thickness of the articles so that a good gripping action is obtained thereon for the purpose of insuring proper advancement through the machine. Moreover, good gripping action may be enhanced by providing the rolls with the octagonal configuration illustrated in the drawings. When rolls of octagonal configuration are employed, the rolls of each pair and like rolls of adjacent pairs are driven in an out of phase relationship of about 22.5°, as best shown in FIGS. 3–6. A slight stretching of the chain in order to pull apart the ends of the articles may be achieved by increasing the diameter or rotational speed of the roll pairs in the direction of chain travel.

In accordance with the present invention, a link joining area sensing device 30 and a sensed link joining area severing or cutter device 32 are arranged at first and second predetermined or fixed points along the course of chain travel immediately adjacent upstream and downstream sides, respectively, of roll pair 18 and 18'. As will become apparent, sensing device 30 is employed to sense the presence of link joining area 12a when presented at the above referred to first predetermined point and to then set in motion a follower mechanism 34, which follows a sensed link joining area during passage thereof downstream along the given course and effects operation of severing device 32 when such sensed link joining area is presented adjacent the above referred to second predetermined point.

Sensing device 30 is best shown in FIGS. 1 and 3 as comprising a sensing finger 36, which is supported for vertical swinging movement transversely of the given course by an elongated arm 38 supported in turn by suitably journaled shaft 40. The weight of sensing finger 36 and arm 38 may be relied upon to maintain finger 36 in surface following engagement with articles 12 and joining areas 12a, but for high speed operating conditions it would be preferable to provide a stronger force than that produced by gravity, such as that provided by a spring device, not shown.

Severing device 32 comprises a cutting knife 44, which is formed with cutting edges 44a and 44b and supported by a shaft 46 for travel transversely of the given course between the "pre-cutting" positions shown in full and phantom line in FIG. 2. During this travel, cutting edges 44a and 44b alternately serve to sever successively presented link joining areas 12a. Travel of knife 44 is controlled by a conventional half-revolution type clutch 48, which is in turn controlled or tripped by follower mechanism 34, once during each joining area sensing-severing cycle of the machine. As best shown in FIG. 2, a rotatable output arm 50 of clutch 48 is connected to shaft 46 by a linkage generally designated at 52. Preferably, clutch 48 has its input, not shown, drivingly connected to the drive for conveyor 10.

Follower mechanism 34 is shown as including a shaft 60, which is suitably journaled to extend concentrically through roll 18 and its associated gear 18a, and a follower arm 62, which is fixed to extend radially of shaft 60 and serves to carry a follower finger 64 for movement along a circular path of travel about the axis of roll 18 for passage between rolls 18 and 18'. In a preferred form of the present construction, follower arm 62 is of a length such that the path of travel of follower finger 64 between rolls 18 and 18' is bisected by a line drawn lengthwise of the given course substantially coincident with the center line of the articles being conveyed. By permitting follower finger 64 to pass "over-center." in this manner, it will be firmly "seated" in association with the sensed joining area even in cases where such joining area is arranged "off-center" relative to the chain.

By referring to FIG. 3, it will be understood that shaft 60 is coupled to clutch 48 by a mechanism including a shaft affixed cam 66, a pivotally supported arm follower 68 and a cam follower connected clutch trip linkage 70. Also, it will be understood that shaft 60 is drivingly connected or coupled to the conveyor drive by a disc type friction clutch 72, but normally constrained from rotation forcing clutch 72 to slip by a retarding force established by a latching or escapement mechanism 74 under the control of sensing device 30.

Latching mechanism 74 comprises a shaft mounted cam or scape wheel 76 having a single tooth 78 and a rocking arm 80, which is formed with stops or pallets 80a and 80b. Rocking arm 80 is connected to the sensor arm supporting shaft 40 by a suitable linkage designated generally at 82.

To facilitate understanding of the operation of the present invention, reference is made to FIG. 3, wherein sensing finger 36 is shown as being retained in its upper or rest position by engagement with the upper surface of one of articles 12. In this position of sensing finger 36, rocking arm stop 80a is positioned for motion arresting engagement with tooth 78 thereby to constrain rotation of shaft 60 and retain follower finger 64 in its first or rest position, also shown in FIG. 3.

Figure 4:
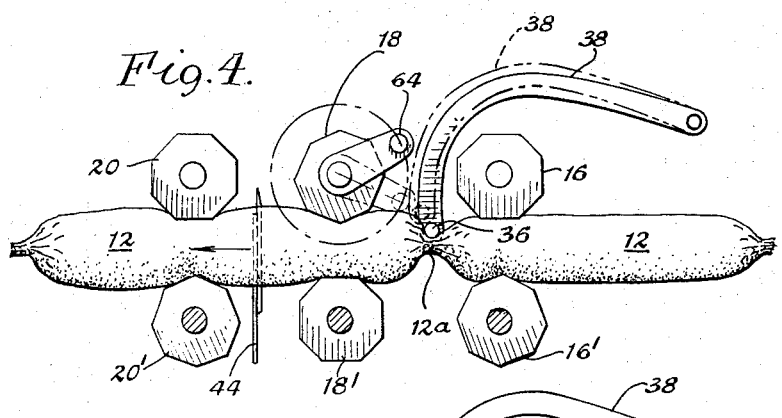
FIGS. 4 through 6 are views illustrating successive portions of the operational cycle of the machine.

When a joining area 12a is presented adjacent sensing device 30, sensing finger 36 is permitted to move downwardly into its operating or release position shown in full line in FIG. 4, whereby effecting removal of rocking arm stop 80a from engagement with tooth 78. This frees shaft 60 for driven rotation through clutch 72 at a speed corresponding to the rotational speed of roller 18; this resulting in the driving of follower finger 64 downwardly in a clockwise sense, as viewed in FIG. 4, into engagement with the trailing end of the article leading the sensed joining area.

Figure 5:
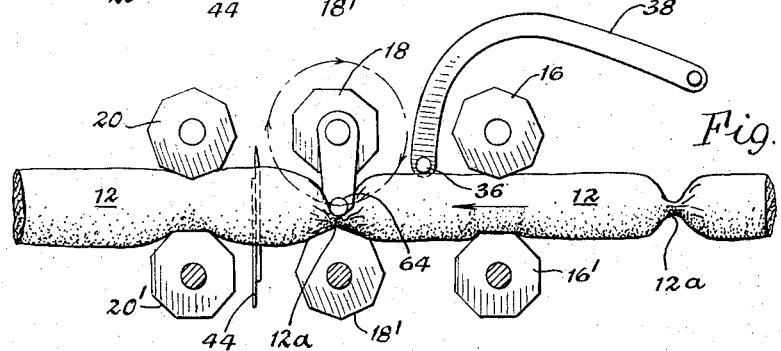

As movement of the articles continues in the manner shown in FIG. 5, follower finger 64 positions itself in engagement with the sensed joining area and moves downstream therewith at an angular speed determined by the linear speed of the sensed joining area; clutch 72 slipping to accommodate for the reduction in angular speed of the follower finger relative to roller 18. In the meantime, sensing finger 36 has been returned to its rest position by engagement with a following article, whereby to reposition rocking arm stop 80a for engagement with tooth 78 at the completion of a full rotational cycle of shaft 60.

Figure 6:
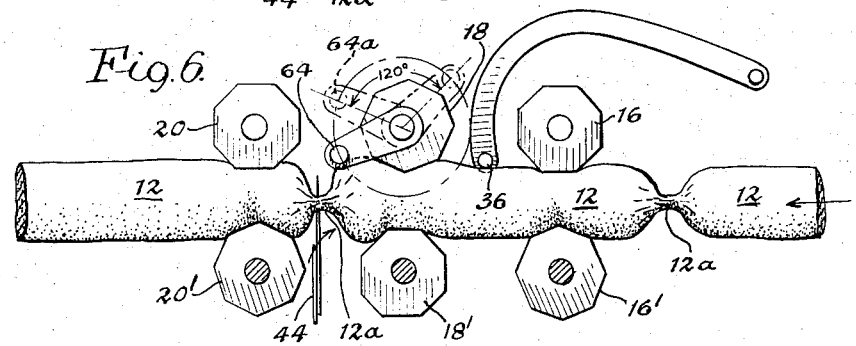

As downstream movement of the chain continues, follower finger 64 is released as it approaches cutter device 32, as generally depicted in FIG. 6, and immediately thereafter cam 66 drives follower 68 to trip or release clutch 48, which in turn drives knife 44 through the sensed joining area.

Under normally operating conditions, follower arm is automatically returned to its first position where it remains until again released as a result of downward movement of sensing finger 36. However, if sensing finger 36 remains in its operating or release position, following release of follower finger 64, as would be the case when the end of the chain is reached, the follower finger is arrested in a second position designated as 64a in FIG. 6 by engagement of tooth 78 with rocking arm stop 80b in order to prevent continuous cycling of the follower arm and knife 44.

I claim:

1. A machine for severing deformable joining areas of a chain of joined articles to divide the chain into individual articles, which comprises in combination:

conveying means for confining and conveying said chain of articles along a given essentially linear course;

sensing means for sensing the presence of said joining areas when presented at a first predetermined point along said given course;

cutter means arranged adjacent a second predetermined point along said given course downstream of said first point;

follower arm means having a follower finger;

rotatable shaft means for supporting said follower arm means for movement of said follower finger along a circular path of travel about an axis disposed transversely of said given course intermediate said first and second points, said path of travel being bisected by a line drawn lengthwise of said given course substantially coincident with a center line of said articles;

shaft drive means including a clutch tending to rotate said shaft means whereby to move said follower finger along said path at a speed in excess of the linear speed of said articles along said course;

latch means for normally constraining rotation of said shaft means whereby to retain said follower finger in a first position along said path said sensing means controlling release of said latch means upon sensing of a joining area as aforesaid to permit said drive means to drive said follower finger along said path of travel from said first position into engagement with said chain in the area of said sensed joining area adjacent said first predetermined point, said follower finger when driven by said drive means along said path of travel in succession moving over center in a first direction relative to said article center line whereby to retain said follower finger frictionally engaged with said chain for movement therewith along said course and then moving over center in a direction opposite to said first direction for disengagement with said chain adjacent said second predetermined point, the speed of said follower finger along said path when frictionally engaged with said chain being determined by the linear speed of the sensed joined area, said drive means tending to return said follower finger to said first position thereof subsequent to disengagement of said follower finger as aforesaid; and coupling means for coupling said cutter means to said follower arm means for joining area cutting movement transversely of said given course substantially coincident with the arrival of said follower finger adjacent said second predetermined point.

2. A machine according to claim 1, wherein said sensing means cooperates with said latch means to constrain said follower finger from return movement to said first position whenever said sensing means senses the absence of said chain subsequent to disengagement of said follower finger from said chain as aforesaid.

3. A machine according to claim 1, wherein said conveying means includes at least one pair of essentially parallel chain forwarding rolls, said one pair being arranged to engage opposite surfaces of said chain intermediate said first and second predetermined points, and said axis is disposed in alignment with the axis of rotation of one roll of said one pair.

4. A machine according to claim 3, wherein said rolls are of octagonal cross-sectional configuration and one of said pairs is driven in an out of phase relationship to the other of said pair of about 22.5°.

5. A machine for severing joining areas of a chain of joined articles to divide the chain into individual articles, which comprises in combination:

conveying means for confining and conveying said chain along a given essentially linear course, said conveying means including a pair of essentially parallel rolls having rotational axes thereof extending transversely of said given course and being relatively spaced for frictional engagement with opposite side surfaces of said chain and roll drive means;

follower arm means having a follower finger;

rotatable shaft means for supporting said follower arm means for movement of said follower finger along a circular path of travel about one of said roll axes for passage between said pair of rolls in engagement with said chain once during each rotational cycle of said follower finger along said path;

clutch means for drivingly connecting said shaft means to said drive means whereby said drive means tends to continuously move said follower finger along said path of travel in the absence of a retarding force applied to said shaft means;

latch means for establishing a retarding force for normally constraining rotation of said shaft means whereby to normally retain said follower finger in a first position along said path;

sensing means for sensing the presence of joining areas when presented at a first predetermined point immediately adjacent an upstream side of said pair of rolls, said sensing means controlling release of said latch means upon sensing of a joining area as aforesaid to permit said drive means to move said follower finger from said first position along said path into engagement with said chain in the area of said sensed joining area at a point along said given course intermediate said upstream side of said pair of rolls and said first predetermined point, engagement of said follower finger with said chain as aforesaid establishing a retarding force whereby passage of said follower finger along said path between said pair of rolls is at a speed determined by the linear speed of said sensed joining area along said given course;

cutter means arranged at a second predetermined point along said given course immediately adjacent a downstream side of said pair of rolls, said drive means moving said follower finger from engagement with said chain at another point along said given course intermediate said downstream side of said rolls and said second predetermined point; and coupling means for coupling said cutter means to said shaft means for effecting cutting of said sensed joining area substantially coincident with arrival of said follower finger at said other point.

6. A machine according to claim 5, wherein said rolls are of octagonal cross-sectional configuration and one of said pairs is driven in an out of phase relationship to the other of said pair of about 22.5°.

7. A machine according to claim 8, wherein said conveying means includes additional pairs of rolls arranged adjacent opposite sides of said pair of rolls along said given course, said rolls being of octagonal cross-sectional configuration, and the rolls of each pair and like rolls of adjacent pairs being driven in an out of phase relationship of about 22.5°.

* * * * *

UNITED STATES PATENT OFFICE
CERTIFICATE OF CORRECTION

Patent No. 3,808,636    Dated May 7, 1974

Inventor(s) Alfred J. Gouba

It is certified that error appears in the above-identified patent and that said Letters Patent are hereby corrected as shown below:

Column 1, line 50, "designated" should be -- designates --.

Column 1, line 56, "included" should be -- including --.

Claim 7:

Line 36, "8" should be -- 5 --.

Signed and sealed this 1st day of October 1974.

(SEAL)
Attest:

McCOY M. GIBSON JR.
Attesting Officer

C. MARSHALL DANN
Commissioner of Patents